June 27, 1950   F. B. HARVUOT   2,512,797
FILTER CARTRIDGE
Filed Sept. 28, 1945
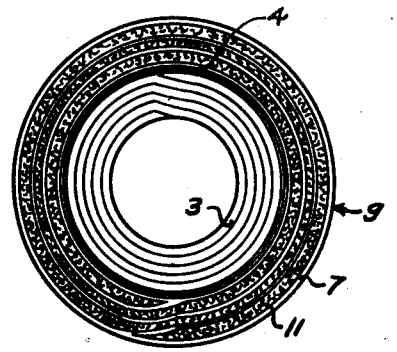
FIG. 3
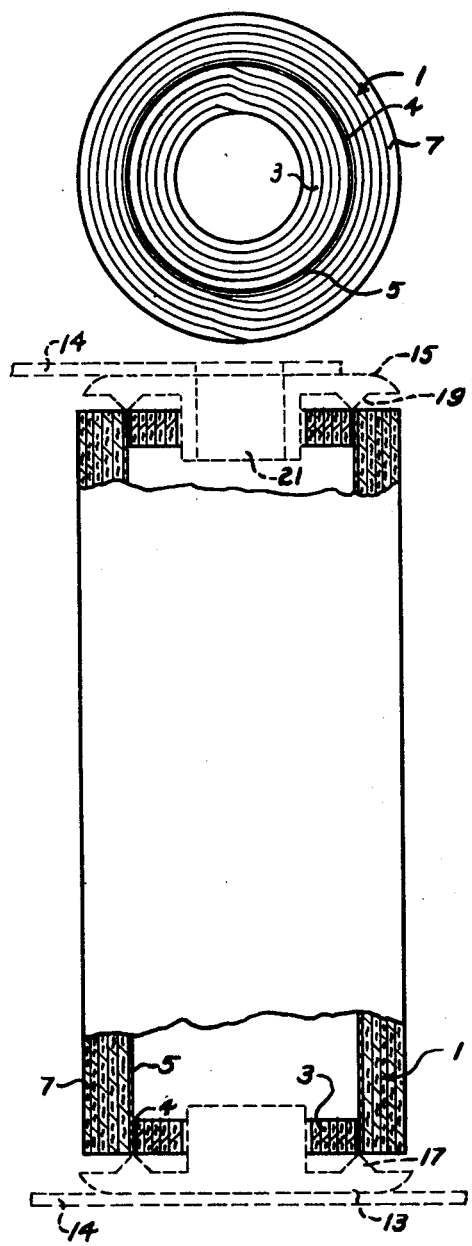
FIG. 1
FIG. 2
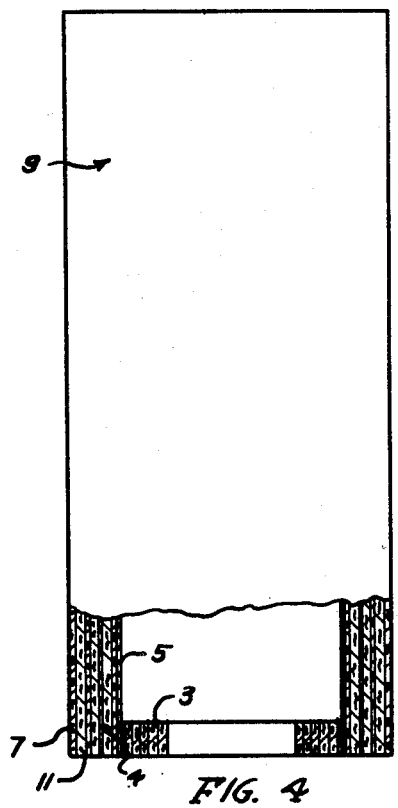
FIG. 4
FRANK B. HARVUOT
INVENTOR.
BY Edmund W. C. Kamm Patented June 27, 1950

2,512,797

UNITED STATES PATENT OFFICE 2,512,797

FILTER CARTRIDGE

Frank B. Harvuot, Fort Wayne, Ind., assignor to Bowser, Inc., Fort Wayne, Ind., a corporation of Indiana Application September 28, 1945, Serial No. 619,085

2 Claims. (Cl. 210—169)

1

This invention relates to a cartridge type filtering element which is adapted to be discarded when it becomes plugged with foreign matter. Specifically, it relates to a filter cartridge made from a sheet of laminated cellulose, preferably sulphite pulp paper, wound into a cylinder comprising a plurality of layers, in the form of a convolute winding lamination, said paper having been treated with a phenolic formaldehyde resin and used alone, or in combination with untreated paper, to form the cylinder.

An object of this invention is to provide a filter cartridge which is inexpensive and can be discarded when it is plugged by foreign matter.

Another object of this invention is to provide a cartridge type filtering unit which has strength and rigidity when immersed in liquid.

Still another object of the invention is to provide a water absorbent paper filter cartridge which will not become soggy when subjected to water, gasolines, oils and many other liquids.

Still another object of the invention is to provide a standard filter cartridge which can be readily adapted in size to meet various installation conditions by cementing inserts into the ends of the cartridge.

Still another object of the invention is to provide a cartridge of phenolic formaldehyde resin-impregnated paper and untreated, water absorbent paper.

Still another object of the invention is to provide a laminated filter cartridge from alternate, convolute layers of phenolic formaldehyde resin-impregnated paper and unimpregnated paper.

These and other objects will become apparent from a study of this specification and the drawing which is attached thereto and made a part hereof.

Figure 1 is an end view of the cartridge, showing the laminations of cloth and impregnated paper, and one of the end bushings.

Figure 2 is an elevation, partly in section, of the filter cartridge showing the laminations of cloth and impregnated paper, and the bushings. The relative positions of the end seal caps are shown dotted.

Figure 3 is an end view of a modified form of the cartridge of Figure 1, showing the layer of cloth, the alternate layers or laminations of impregnated and unimpregnated paper, and the end bushings.

Figure 4 is an elevation, partly in section, of the cartridge of Figure 3.

The cartridge shown in Figures 1 and 2 is comprised of two elements, the roll or cylinder 1 and two end inserts or bushings 3.

2

The paper used is a white, sulphite paper made up by superposing numerous thin strips of the paper into a relatively loose pile, which is called "cellulose wadding" in the trade. The thickness of the wadding may be varied by changing the number of sheets or plies. Five to twelve ply paper has been successfully used in filters of the type herein disclosed. Each ply is about .0025 inch thick.

The cylinder is made up on a mandrel and is preferably comprised of a layer or two of cheesecloth 5 which has preferably been impregnated with irreversible, thermosetting, phenolic formaldehyde resin or similar material upon which the irreversible, thermosetting, phenolic formaldehyde resin-impregnated paper 7 is wrapped. The paper is fed from a parent roll which has been maintained at the proper temperature and humidity to retain the tackiness of the resin. The paper is sprayed with water as it is fed onto the previously dampened cheesecloth and is further sprayed while the cartridge is being wrapped to the desired diameter.

The paper sheet is then cut or torn from the parent roll, and additional water is added to the loose end of the cylinder to provide a sticky strip which is then wound onto and pressed down on the cylinder to form a joint. The mandrel and the cylinder are removed from the winding machine and placed in an oven and baked at a temperature of about 250 degrees Fahrenheit from four to six hours. The baking loosens the mandrel from the cylinder so that it can be withdrawn and also renders the resin, which has heretofore been soluble in water, insoluble in water, petroleum products and many other liquids.

The cartridge is then sawed to length, squaring both ends, and the bushings 3 are inserted, using an air-drying glue 4 which is insoluble in water, gasoline, oils and many other liquids. Any suitable glue may be used.

The plugs are made by winding a long cylinder in a manner similar to the cylinder 1, with the initial cloth wrapping preferably omitted, which is then cut into lengths of approximately ¼" to $\frac{5}{16}$". The inside diameter of the insert is sufficiently large to receive the hub of the end caps (to be described) while the outside diameter is such that the insert will be easily received by the bore in cylinder 1.

Modified construction

An alternate or modified construction is shown in Figures 3 and 4. The cylinder 9 is wound upon a mandrel that is identical with the one used in wrapping cylinder 1. One or more layers of the impregnated cloth 5 are wrapped around the mandrel and sprayed with water, one or more primary layers of the impregnated paper are then wound onto the cloth, and thereafter a sheet of unimpregnated paper 11 and the one of impregnated paper 7 are wound simultaneously on the primary layers so that there will be a double spiral in the intermediate section, one spiral being of unimpregnated cellulose wadding and the other of impregnated wadding. The last or outer layers are of impregnated paper only, wetted and wound together. Water is sprayed on the impregnated sheet throughout the winding of the modified cylinder. The unimpregnated paper is a crepe wadding and is preferably the same material as the impregnated paper before impregnation. The cylinder 9 is then cut to length and plugs 3 of impregnated paper only are inserted in each end of the bore of the outer cylinder in the same manner as in cylinder 1.

It is to be understood that one or more wraps of impregnated paper may be used at the inner or outer surface of the cylinder as may be required for the service to which the cartridge is to be put. If higher pressures are to be used, the unit must be made more rigid and stronger.

Cylinders 1 and 9 are both designed for outside-in filtration, and for this purpose end caps 13 and 15, which are fixed on case elements 14 and are shown in dotted lines, are used to fix the cartridge in a filter tank 14 and to seal the ends. In operation, the V section sealing rings 17 and 19 of these caps are pressed into the ends of the cylinder, to a depth of perhaps 1/8 to 3/16 of an inch, to form a seal at each end. The contact of the rings is substantially at the juncture of the insert and the tube. The cap 13 is blind, while cap 15 has a port 21 for passing the filtrate out of the cartridge to the filter outlet. The caps 13 and 15 may be formed as a part of the case for the cartridge or as individual parts for mounting in the case, as may be required.

When the differential pressure between the inlet and the outlet builds up and the rate of flow of the filtrate decreases beyond reasonable limits, the cartridge is removed and a new one inserted.

In the cartridge shown in Figures 1 and 2, the degree of filtration, that is, the minimum particle size removed, may be varied somewhat by the tension applied in rolling the cartridge; and while the cartridge will hold a very small amount of water, it is not primarily a dehydrator.

In the cartridge shown in Figures 3 and 4, the degree of filtration attained is not as fine as that of the first form, but the cellulose wadding takes up a great deal of water. Further, the flow rate is considerably greater than that attained by the first cartridge. The structural strength of the second form is inferior to that of the first.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. A filtering element comprising a tube comprising an inner section having a plurality of wraps of resin-impregnated paper, and a section comprising a plurality of wraps of super-posed sheets of phenolic formaldehyde resin-impregnated paper and crepe wadding.

2. A filtering element comprising a tube formed of a wrap of resin-impregnated cloth, a plurality of wraps or resin-impregnated paper and a section comprising a plurality of wraps of superposed sheets of phenolic formaldehyde resin-impregnated paper and cellulose wadding.

FRANK B. HARVUOT.

REFERENCES CITED

The following references are of record in the file of this patent:

UNITED STATES PATENTS

| Number | Name | Date |
|---|---|---|
| 817,253 | Kneuper | Apr. 10, 1906 |
| 1,744,510 | Hele-Shaw et al. | Jan. 21, 1930 |
| 2,092,548 | Briggs | Sept. 7, 1937 |
| 2,170,074 | Hewitt | Aug. 22, 1939 |
| 2,196,821 | Arnold | Apr. 9, 1940 |
| 2,325,399 | Houston | July 27, 1943 |
| 2,347,384 | Winslow et al. | Apr. 25, 1944 |